United States Patent
Hu et al.

(10) Patent No.: US 10,651,472 B2
(45) Date of Patent: May 12, 2020

(54) SODIUM ION SECONDARY BATTERY ANODE MATERIAL AND PREPARING METHOD AND APPLICATION THEREOF

(71) Applicant: INSTITUTE OF PHYSICS,THE CHINESE ACADEMY OF SCIENCES, Beijing (CN)

(72) Inventors: Yongsheng Hu, Beijing (CN); Yunming Li, Beijing (CN); Liquan Chen, Beijing (CN)

(73) Assignee: Institute of Physics, The Chinese Academy of Sciences, Beijing (CN)

( * ) Notice: Subject to any disclaimer, the term of this patent is extended or adjusted under 35 U.S.C. 154(b) by 5 days.

(21) Appl. No.: 15/752,399

(22) PCT Filed: Nov. 11, 2015

(86) PCT No.: PCT/CN2015/094342
§ 371 (c)(1),
(2) Date: Feb. 13, 2018

(87) PCT Pub. No.: WO2017/070988
PCT Pub. Date: May 4, 2017

(65) Prior Publication Data
US 2019/0006673 A1  Jan. 3, 2019

(30) Foreign Application Priority Data
Oct. 27, 2015 (CN) .......................... 2015 1 0708632

(51) Int. Cl.
*H01M 4/02* (2006.01)
*H01M 4/587* (2010.01)
(Continued)

(52) U.S. Cl.
CPC ........... *H01M 4/587* (2013.01); *H01M 4/133* (2013.01); *H01M 4/1393* (2013.01);
(Continued)

(58) Field of Classification Search
CPC ...................................................... H01M 4/02
See application file for complete search history.

(56) References Cited

U.S. PATENT DOCUMENTS

| 6,231,829 B1 | 5/2001 | Lee et al. | |
|---|---|---|---|
| 2014/0023922 A1* | 1/2014 | Isshiki | ................... H01G 11/22 429/211 |

(Continued)

FOREIGN PATENT DOCUMENTS

| CN | 101154755 A | 4/2008 |
|---|---|---|
| CN | 102484252 A | 5/2012 |

(Continued)

OTHER PUBLICATIONS

Zheng, T., Xing, W. and Dahn, Jr., 1996. Carbons prepared from coals for anodes of lithium-ion cells. Carbon, 34(12), pp. 1501-1507.

(Continued)

*Primary Examiner* — Jacob B Marks
(74) *Attorney, Agent, or Firm* — TraskBritt

(57) ABSTRACT

The invention discloses a sodium ion secondary battery anode material, and a preparing method and application thereof. The material is an amorphous carbon material, and is obtained by performing high-temperature pyrolyzing on coal as a main raw material, the material is prepared by using coal and a hard carbon precursor as raw materials, mechanical mixing after adding a solvent, drying, and crosslinking, curing and pyrolyzing under an inert gas atmosphere, or prepared by using coal as a raw material, and pyrolyzing under an inert gas atmosphere. The sodium ion secondary battery prepared from the amorphous carbon material as anode material has lower cost and higher work voltage, and is stable in cycle and good in safety.

17 Claims, 11 Drawing Sheets

(51) Int. Cl.
*H01M 4/1393* (2010.01)
*H01M 4/133* (2010.01)
*H01M 4/36* (2006.01)
*H01M 10/054* (2010.01)

(52) U.S. Cl.
CPC .......... *H01M 4/366* (2013.01); *H01M 10/054* (2013.01); *H01M 2004/027* (2013.01)

(56) References Cited

U.S. PATENT DOCUMENTS

| | | | |
|---|---|---|---|
| 2014/0373677 A1* | 12/2014 | Stumpf | C21B 3/00 75/10.38 |
| 2015/0171417 A1 | 6/2015 | Ijiri et al. | |
| 2015/0221947 A1 | 8/2015 | Ono et al. | |

FOREIGN PATENT DOCUMENTS

| | | |
|---|---|---|
| CN | 104364192 A | 2/2015 |
| JP | H09330714 | 12/1997 |
| JP | H10021911 A | 1/1998 |
| JP | H10162827 A | 6/1998 |
| JP | H11204106 A | 7/1999 |
| JP | H11339795 A | 12/1999 |
| JP | 2001-313032 A | 11/2001 |
| JP | 2009-206065 A | 9/2009 |
| JP | 2012-169160 A | 9/2012 |
| JP | 2014-132549 A | 7/2014 |
| JP | 2014-132592 A | 7/2014 |
| JP | 2014-203530 A | 10/2014 |
| JP | 2014-225421 A | 12/2014 |
| WO | 2012002459 A1 | 1/2012 |

OTHER PUBLICATIONS

Ponrouch, A. and Palacin, M.R., 2015. On the high and low temperature performances of Na-ion battery materials: Hard carbon as a case study. Electrochemistry Communications, 54, pp. 51-54.
Chinese Office Action for Chinese Application CN 201510708632.8, dated Feb. 26, 2016, 14 pages.
Chinese Office Action for Chinese Application CN 201510708632.8, dated May 5, 2016, 15 pages.
Chinese Office Action for Chinese Application CN 201510708632.8, dated Aug. 23, 2016, 16 pages.
International Search Report for International Application No. PCT/CN2015/094342, dated Apr. 28, 2016, 5 pages.
International Written Opinion for International Application No. PCT/CN2015/094342, dated Apr. 28, 2016, 9 pages.
Japanese Search Report for Japanese Application JP 2018513374, dated Mar. 4, 2019, 36 pages.
Japanese Notice of Reasons for Refusal for Japanese Application JP 2018513374, dated Apr. 17, 2019, 10 pages.
Japanese Written Opinion for Japanese Application JP 2018513374, dated Aug. 6, 2019, 4 pages.

* cited by examiner

SODIUM ION SECONDARY BATTERY ANODE MATERIAL AND PREPARING METHOD AND APPLICATION THEREOF

TECHNICAL FIELD

The invention relates to the technical field of materials, in particular to a sodium ion secondary battery anode material and a preparing method and application thereof.

BACKGROUND

Along with exhaustion of fossil fuels, the use of renewable energy sources such as solar energy and wind energy attracts more and more attention, however, due to intermittency these renewable energy sources cannot continuously main the supply to the power grid, so that the development of energy storage systems is vital to employ renewable energy sources. Due to abundant reserves and wide distribution of sodium resources, sodium ion batteries have a potential advantage of low cost, more importantly, taking sodium ions as carriers to find new electrochemical reaction mechanisms and new materials to realize the goal of further cost-reduction. For example, sodium and aluminum will not be subject to alloying reaction so that the aluminum foil can serve as anode current collectors (since lithium can alloy with aluminum the anode current collector of lithium ion battery cannot use the aluminum foil), thus the problem that the oxidation of the current collector caused by overdischarge of the sodium ion battery is effectively avoided, and the battery is convenient to store and transport.

The development and application of high-performance and low-cost anode materials is an important step for the commercialization of sodium ion batteries. At present, commercialized lithium ion batteries mainly use the graphite materials as mainstream anodes, but because of the thermodynamics reason, sodium ions are difficult to embed between the graphite material layers, and cannot serve as the anode of the sodium ion batteries.

In numerous researched anode materials of the sodium ion batteries, hard carbon becomes the anode material with the largest application prospect due to its high specific capacity, low sodium storage potential and the like. The precursors for preparing the hard carbon material mainly comprise cellulose, saccharides, furan resin, phenolic resin, polyvinylidene chloride and the like, thus the hard carbon is high in price as these precursors have high price and low carbon yield, together with the complex hard carbon preparing processes, limiting the large-scale application of the hard carbon material.

According to embodiments of the invention, an amorphous carbon material with adjustable disorder degree, simple preparation method, low cost, high carbon yield and easy available raw materials has been prepared by taking low-cost coal as a main raw material, and the obtained carbon material is particularly suitable for serving as the anode material of the sodium ion secondary batteries.

SUMMARY

Embodiments of the invention provide a sodium ion secondary battery anode material and a preparing method and application thereof. The preparing method of the material is simple, low in cost, high in carbon yield and suitable for large-scale production, and raw materials are easy to obtain.

On a first aspect, embodiments of the invention provide a sodium ion secondary battery anode material characterized in an amorphous feature, which is prepared by using coal and a hard carbon precursor as raw materials, and through stirring and mixing after adding a solvent, drying, and following crosslinking, curing and pyrolyzing under an inert gas atmosphere.

Preferably, material is granular with an average grain size of 1-50 μm; a $d_{002}$ value is between 0.35-0.42 nm, an $L_c$ value is between 1-4 nm and an $L_a$ value is between 3-5 nm.

Preferably, the surface of the material is provided with a coating layer.

Preferably, the coal comprises one or a mixture of any composite of anthracite, bitumite and lignite; and the hard carbon precursor comprises one or a mixture of any composite of glucose, sucrose, lignin, cellulose, starch, phenolic resin, polyacrylonitrile and epoxy resin.

On a second aspect, embodiments of the invention provide a sodium ion secondary battery anode material, characterized in that the material is an amorphous carbon material, which is prepared by using coal as a raw material, and pyrolyzed under an inert gas atmosphere.

Preferably, the material is granular with average grain size of 1-50 μm; a $d_{002}$ value is between 0.35-0.42 nm, an $L_c$ value is between 1-4 nm and an $L_a$ value is between 3-5 nm.

Preferably, the surface of the material is provided with a coating layer.

Preferably, the coal comprises one or a mixture of any composite of anthracite, bitumite and lignite.

On a third aspect, embodiments of the invention provide a preparing method of a sodium ion secondary battery anode material, characterized in that the method comprises following steps:

(1) adding coal and a hard carbon precursor into a solvent according to a mass ratio of 1:(0-0.99), and then performing mechanical mixing to obtain a slurry;

(2) directly drying the slurry in an oven or spray-drying the slurry into balls;

(3) rising temperature to 400-600° C. under an inert gas atmosphere and reacting for 0.5-5 h;

(4) rising temperature to 1000-1600° C. under an inert gas atmosphere and reacting for 0.5-10 h;

(5) cooling to obtain the sodium ion secondary battery anode material, wherein, the steps (3)-(5) are directly performed when the mass ratio of the coal and the hard carbon precursor in step (1) is 1:0.

Preferably, temperature rising rate in step (3)-(4) is 0.5-10° C./min.

Preferably, the mechanical mixing comprises any one or more of ball grinding, stirring and ultrasonic dispersing.

Preferably, the method further comprises:

introducing gas containing hydrocarbon with a flow of 0.5-200 mL/min in a reaction process of step (4) for surface coating;

the gas containing hydrocarbon comprises any one or more of natural gas, methane, ethane, methylbenzene, ethylene, acetylene and allylene.

On a fourth aspect, embodiments of the invention provide an anode of a secondary battery, characterized in that the anode comprises:

a current collector, a binder coated onto the current collector and the sodium ion secondary battery anode material according to the first aspect.

On a fifth aspect, embodiments of the invention provide a secondary battery comprising the anode according to the fourth aspect.

On a sixth aspect, embodiments of the invention provide application of the secondary battery according to the fifth aspect, characterized in that the secondary battery is used for mobile devices, electric vehicles, and large-scale energy storage devices of solar power generation, wind power generation, intelligent power grid peak pitching, distributed power stations, standby power sources or communication base stations.

On a seventh aspect, embodiments of the invention provide an anode of a secondary battery, characterized in that the anode comprises:

a current collector, a binder coated onto the current collector and the sodium ion secondary battery anode material according to the second aspect.

On an eighth aspect, embodiments of the invention provide a secondary battery comprising the anode according to the fourth aspect.

On a ninth aspect, embodiments of the invention provide application of the secondary battery according to the eighth aspect, characterized in that the secondary battery is used for mobile devices, electric vehicles, and large-scale energy storage devices of solar power generation, wind power generation, intelligent power grid peak pitching, distributed power stations, standby power sources or communication base stations.

The preparing method for the sodium ion secondary battery anode material provided by the embodiments of the invention is simple, very low in cost, high in production efficiency and suitable for industrialized production, and raw materials are easy to obtain. The sodium ion secondary battery using the material of the invention as the anode material has higher work voltage, stable cycle and good safety, can be used for power sources of mobile devices, electric vehicles, and large-scale energy storage devices of solar power generation, wind power generation, intelligent power grid peak pitching, distributed power stations, standby power sources or communication base stations.

DETAILED DESCRIPTION

Figures 1, 2:
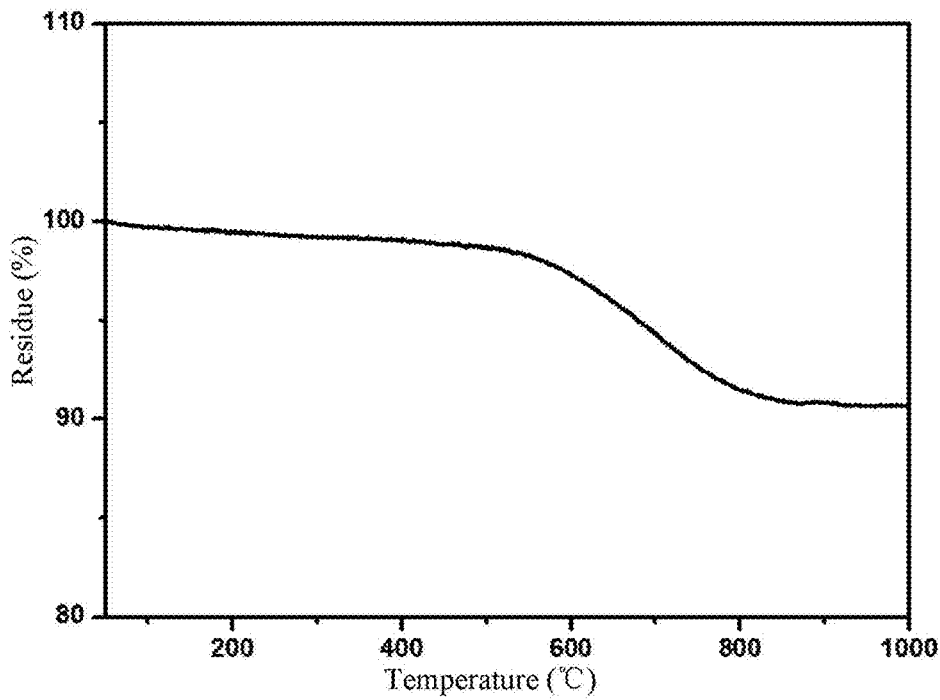
FIG. 1 is a thermal weight loss curve of anthracite provided according to an embodiment 2 of the invention.
FIG. 2 is a preparing method provided according to an embodiment 3 of the invention.

The invention is further described in detail by figures and embodiments which do not intend to limit a protection scope of the invention.

Embodiment 1

An embodiment 1 of the invention provides a sodium ion secondary battery anode material, the material is an amorphous carbon material, which is prepared by using coal and a hard carbon precursor as raw materials, stirring and mixing after adding a solvent, drying, and crosslinking, curing and pyrolyzing under an inert gas atmosphere.

The coal and hard carbon precursor are added into the solvent according to a mass ratio of 1:(0-0.99), and then mechanically mixed to obtain slurry; then the slurry is dried, crosslinked, cured and pyrolyzed under the inert gas atmosphere to finally obtain the required material. It needs to be noted that at the moment, a case of 1:0 does not exist, namely the hard carbon precursor definitely exists at the moment, wherein, the solvent may be selected from one or a mixture of any composite of water, ethanol, isopropanol, acetone and dimethylformamide; the coal may be selected from one or a mixture of any composite of anthracite, bitumite and lignite; the hard carbon precursor can be selected from one or a mixture of any composite of glucose, sucrose, lignin, cellulose, starch, phenolic resin, polyacrylonitrile and epoxy resin; and the mechanical mixing can be selected from manners of ball grinding, stirring and ultrasonic dispersing, and match of any composite manners of above manners.

Optionally, gas containing hydrocarbon can be added in a reaction process for surface coating, so that the surface has a coating layer, and the gas is preferably natural gas, methane, ethane, methylbenzene, ethylene, acetylene, allylene, etc., wherein, the material is granular, average grain size of granules is 1-50 μm; a $d_{002}$ value is between 0.35-0.42 nm, an $L_c$ value is between 1-4 nm and an $L_a$ value is between 3-5 nm.

The sodium ion secondary battery anode material provided in this embodiment is prepared by mixing the coal and hard carbon precursor as raw materials, both yield and comprehensive electrochemical performances of the amorphous carbon are improved. The degree of disorder of the amorphous carbon material can be adjusted by adjusting a ratio of the coal and hard carbon precursor or processing temperature, thus obtaining the amorphous carbon material with the optimal performance according to different requirements.

Embodiment 2

An embodiment 2 of the invention provides a sodium ion secondary battery anode material, the material is an amorphous carbon material, which is prepared by using coal as a raw material, and pyrolyzing under an inert gas atmosphere, wherein, the coal comprises one or a mixture of any composite of anthracite, bitumite and lignite.

Optionally, gas containing hydrocarbon can be added in a reaction process for surface coating, so that the surface has a coating layer, and the gas is preferably natural gas, methane, ethane, methylbenzene, ethylene, acetylene, allylene, etc., wherein, the material is granular, average grain size of granules is 1-50 μm; a $d_{002}$ value is between 0.35-0.42 nm, an $L_c$ value is between 1-4 nm and an $L_a$ value is between 3-5 nm.

The sodium ion secondary battery anode material provided in this embodiment is prepared by using coal as the raw material, both yield and comprehensive electrochemical performances of the amorphous carbon are improved, the degree of disorder of the amorphous carbon material can be adjusted by adjusting processing temperature, thus obtaining the amorphous carbon material with the optimal performance according to different requirements. FIG. 1 is a thermal weight loss curve of anthracite under 1000° C., a carbon yield thereof is up to 90%.

Embodiment 3

The embodiment provides a preparing method of a sodium ion secondary battery anode material, which is as shown in FIG. 2, and comprises:

(1) adding coal and a hard carbon precursor into a solvent, and then performing mechanical mixing to obtain a slurry;

specifically, the coal and hard carbon precursor are added into a solvent according to a mass ratio of 1:(0-0.99), and then mechanical mixing is performed to obtain a uniform slurry. It needs to be noted that at the moment, a case of 1:0 does not exist, namely the hard carbon precursor definitely exists at the moment, wherein, the solvent can be selected from one or a mixture of any composite of water, ethanol, isopropanol, acetone and dimethylformamide; the coal can be selected from one or a mixture of any composite of anthracite, bitumite and lignite; the hard carbon precursor can be selected from one or a mixture of any composite of glucose, sucrose, lignin, cellulose, starch, phenolic resin, polyacrylonitrile and epoxy resin; and the mechanical mixing can be selected from manners of ball grinding, stirring and ultrasonic dispersing, and match of any composite manners of above manners.

It needs to be noted that the time for mechanical mixing is set according to the used coal and hard carbon precursor and a ratio thereof, and a used mechanical mixing manner, and the coal and hard carbon precursor in the mixed slurry have to be fully and uniformly mixed.

(2) drying the slurry;

specifically, the uniform slurry obtained in step (1) is directly dried in an oven or spray-dried into spheres, and the aim of drying is to remove the solvent;

(3) rising temperature to 400-600° C. under an inert gas atmosphere and reacting for 0.5-5 h;

specifically, the dried substance is loaded into a porcelain boat and is placed into a tubular furnace wherein, firstly, inert gas preferably nitrogen gas is introduced, then temperature rises to 400-600° C. at a rate of 0.5-10° C./min, reacting is performed under such condition to enable the coal and hard carbon precursor to be subject to crosslinking and curing reaction;

(4) rising temperature to 1000-1600° C. under the inert gas atmosphere and reacting for 0.5-10 h;

specifically, after curing is finished, in the tubular furnace, the temperature rises to 1000-1600° C. at a rate of 0.5-10° C./min, heat preservation lasts for 0.5-10 h to enable the coal and hard carbon precursor to be subject to pyrolyzing reaction;

optionally, gas containing hydrocarbon can be added in a reaction process for surface coating, so that the surface has a coating layer, and the gas is preferably natural gas, methane, ethane, methylbenzene, ethylene, acetylene, allylene, etc.;

in the process, the coal and hard carbon precursor are subject to pyrolyzing reaction to generate the amorphous carbon material.

(5) cooling to obtain the sodium ion secondary battery anode material;

specifically, cooling can adopt natural cooling, the material is taken out from the tubular furnace after being cooled to room temperature and smashed, thus obtaining the required amorphous carbon material, namely the sodium ion secondary battery anode material, wherein, the steps (3)-(5) are directly performed when the mass ratio of the coal and precursor in step (1) is 1:0;

specifically, the coal is subject to pyrolyzing reaction in both step (3) and step (4).

The preparing method for the sodium ion secondary battery anode material provided in this embodiment is simple, easy, low in cost, high in carbon yield, and suitable for large-scale manufacturing and application, and raw materials are easy to obtain. In preparing, mixed coal and hard carbon precursor are adopted as raw materials, so both carbon yield and comprehensive electrochemical performances of the amorphous carbon are improved. The degree of disorder of the amorphous carbon material can be adjusted by adjusting a ratio of the coal and hard carbon precursor or processing temperature, thus obtaining the amorphous carbon material with the optimal performance according to different requirements, and the amorphous carbon material can be applied to the anode active material of the sodium ion secondary battery.

In order to better understand technical solutions provided in the invention, multiple examples are used for respectively describing a specific process of the amorphous carbon material prepared by using the preparing method for the sodium ion secondary battery anode material provided in the embodiment 3 of the invention, as well as the methods of the amorphous carbon material used in the sodium ion secondary batteries, and battery characteristics of the sodium ion secondary batteries Embodiment 4

Figure 3:
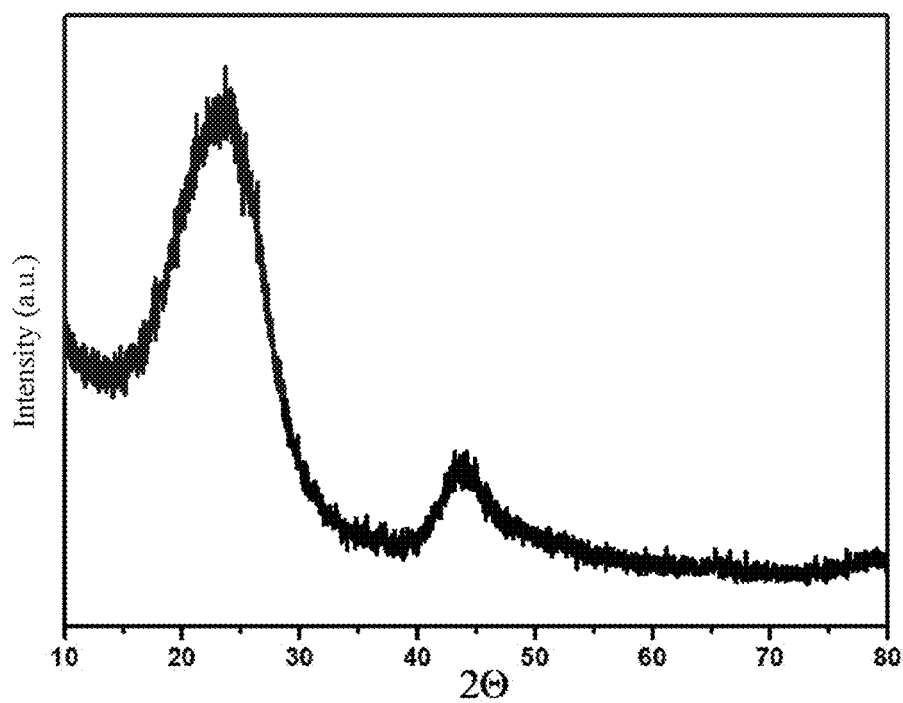
FIG. 3 is an XRD pattern of an amorphous carbon material provided according to an embodiment 4 of the invention.
Figure 4:
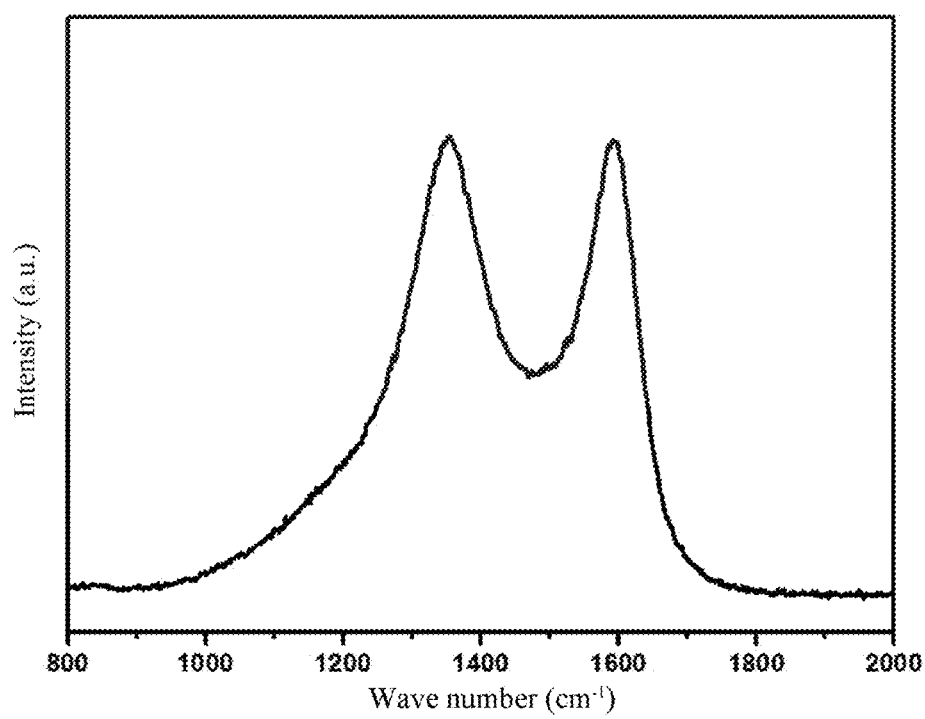
FIG. 4 is a Raman spectrum of an amorphous carbon material provided according to the embodiment 4 of the invention.
Figure 5:
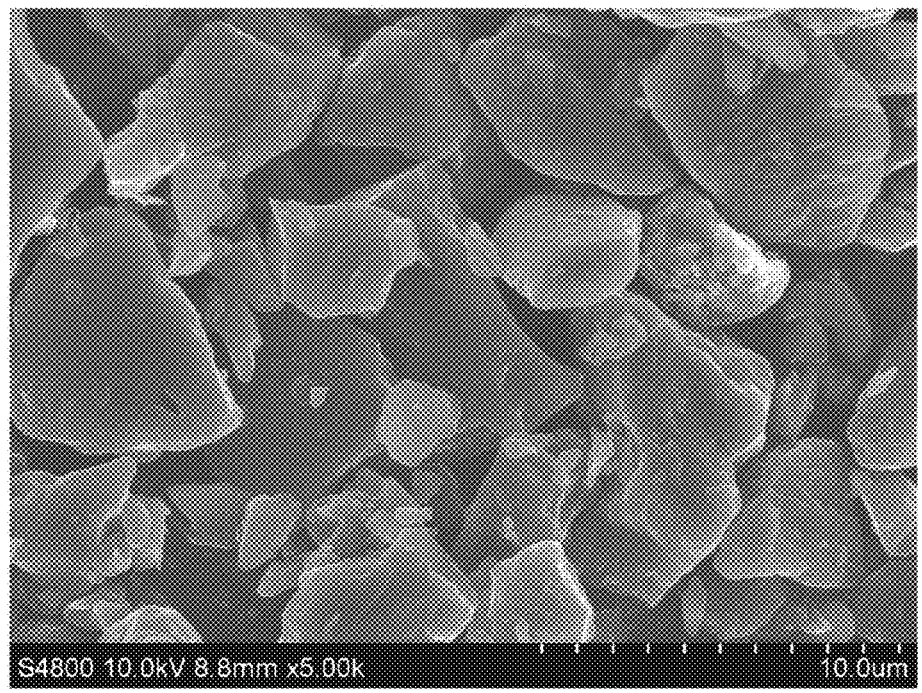
FIG. 5 is an SEM diagram of an amorphous carbon material provided according to the embodiment 4 of the invention.

Anthracite of 2 g is weighed, loaded into a porcelain boat and placed into a tubular furnace, firstly, nitrogen gas is introduced as protective gas, then temperature rises to 500° C. at a rate of 1° C./min, and heat preservation is performed for 2 h; then temperature rises to 1200° C. at a rate of 3° C./min, and heat preservation is performed for 2 h; and the material is taken out after being naturally cooled to room temperature and smashed, thus obtaining the final amorphous carbon material, namely, the sodium ion secondary battery anode material. An X-Ray Diffraction (XRD) pattern thereof refers to FIG. 3, and it can be obtained from the XRD pattern that the amorphous carbon material has a $d_{002}$=0.377 nm and $L_c$=1.73 nm, an Raman spectrum thereof refers to FIG. 4, and it can be obtained from the Raman spectrum that the amorphous carbon material has $L_a$=4.36 nm. FIG. 5 is a Scanning Electron Microscope (SEM) diagram of the amorphous carbon material prepared according to the embodiment, and from FIG. 5, the granule size distribution of the amorphous carbon material prepared in this embodiment is mainly between 1-10 micrometers.

The prepared amorphous carbon material is used as an active substance of the battery anode material for preparing the sodium ion battery.

Powder of the prepared amorphous carbon material and binder of sodium alginate are mixed according to a mass ratio of 95:5, a proper amount of water is added to form slurry, which is then uniformly coated at an aluminum foil current collector, after drying, the coated aluminum foil current collector is cut into polar pieces of (8×8)mm². The polar pieces are dried for 10 h under 100° C. in vacuum, and then immediately transferred to a glovebox for standby.

Figure 6:
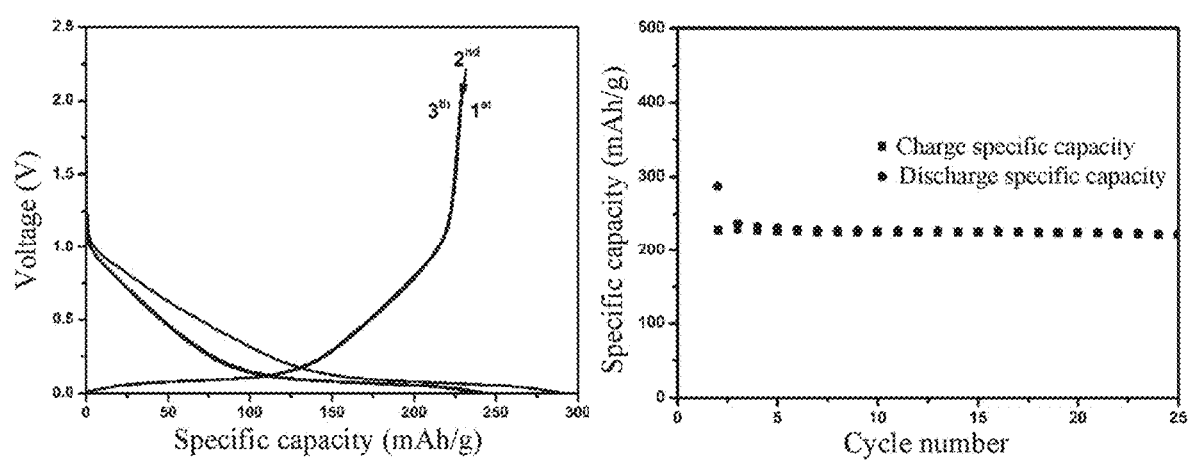
FIG. 6 is a constant current charge and discharge curve and cycle diagram of a sodium ion battery provided according to the embodiment 4 of the invention.

Battery assembly is conducted in the glovebox in Ar atmosphere, using metal sodium as counter electrode and a solution of 1 mol $NaPF_6$ dissolving into ethylene carbonate and diethyl carbonate with a volume ratio being 1:1 as electrolyte, to assemble into a CR2032 button cell. A constant current charge and discharge mode is used to perform a constant current charge and discharge test under a current density of C/10. Under the conditions that the voltage is 0V during discharge and voltage is 2V during charge, a test result is as shown in FIG. 6, from FIG. 6, reversible specific capacity is 228 mAh/g, the first cycle coulombic efficiency is 80% and cycle is stable. Seen from a constant charge and discharge curve shape, a sodium storage process comprises two steps, a discharge curve slope part corresponds to the storage of sodium ions in defects and surface of the amorphous carbon material and a low potential plateau corresponds to the storage of the sodium ions in nanovoids in the amorphous carbon material, and this sodium storage mechanism is totally different from the storage of the lithium ions between graphite layers.

Embodiment 5

Figure 7:
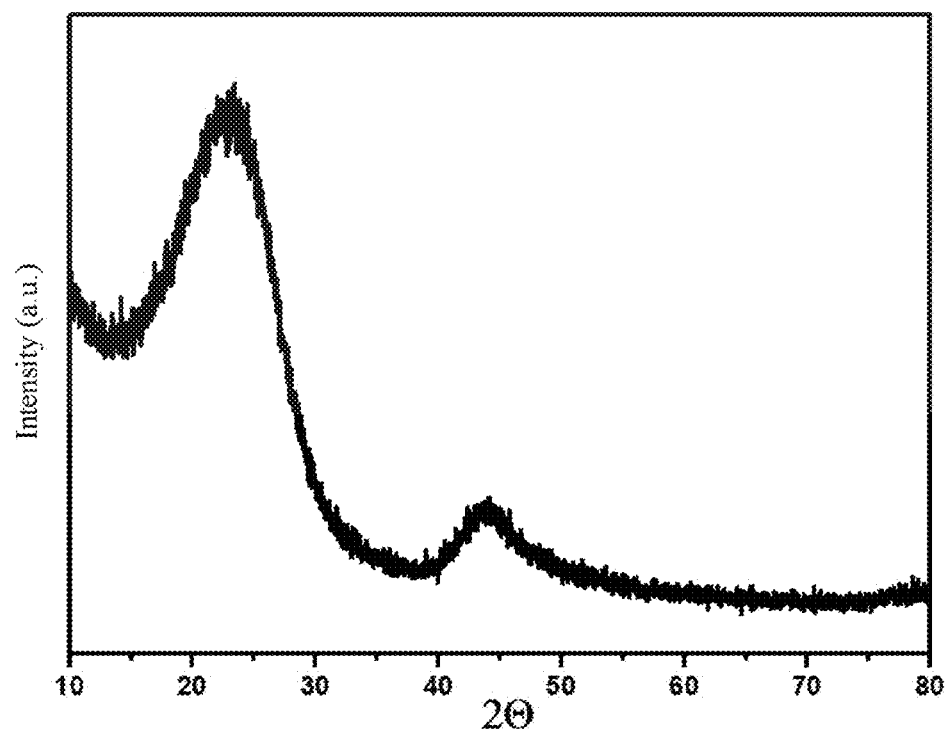
FIG. 7 is an XRD pattern of an amorphous carbon material provided according to an embodiment 5 of the invention.
Figure 8:
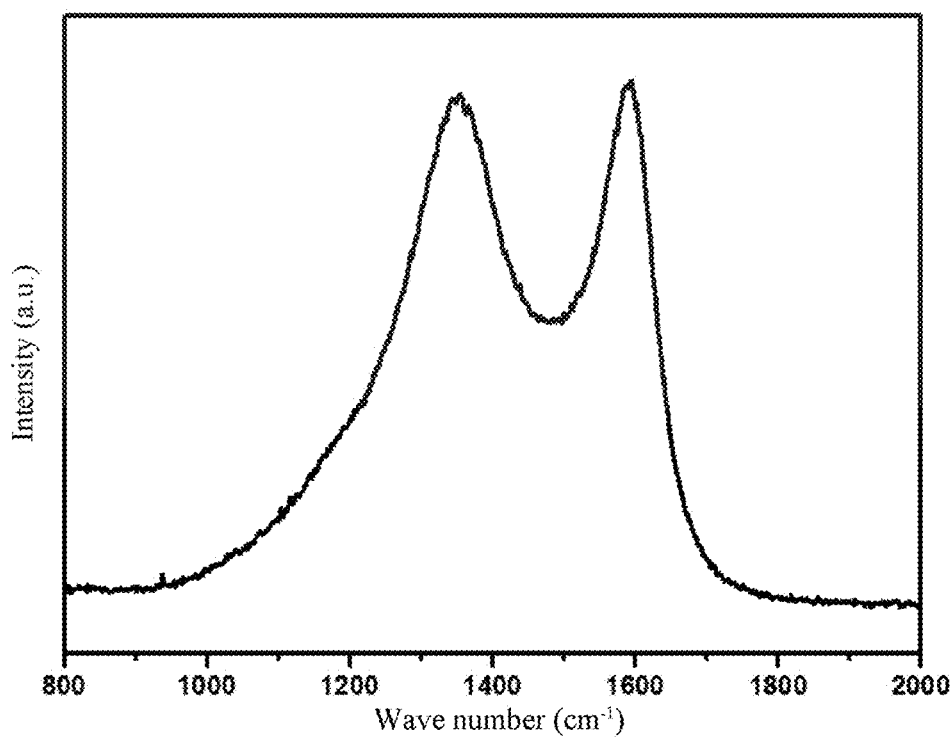
FIG. 8 is a Raman spectrum of an amorphous carbon material provided according to the embodiment 5 of the invention.
Figure 9:
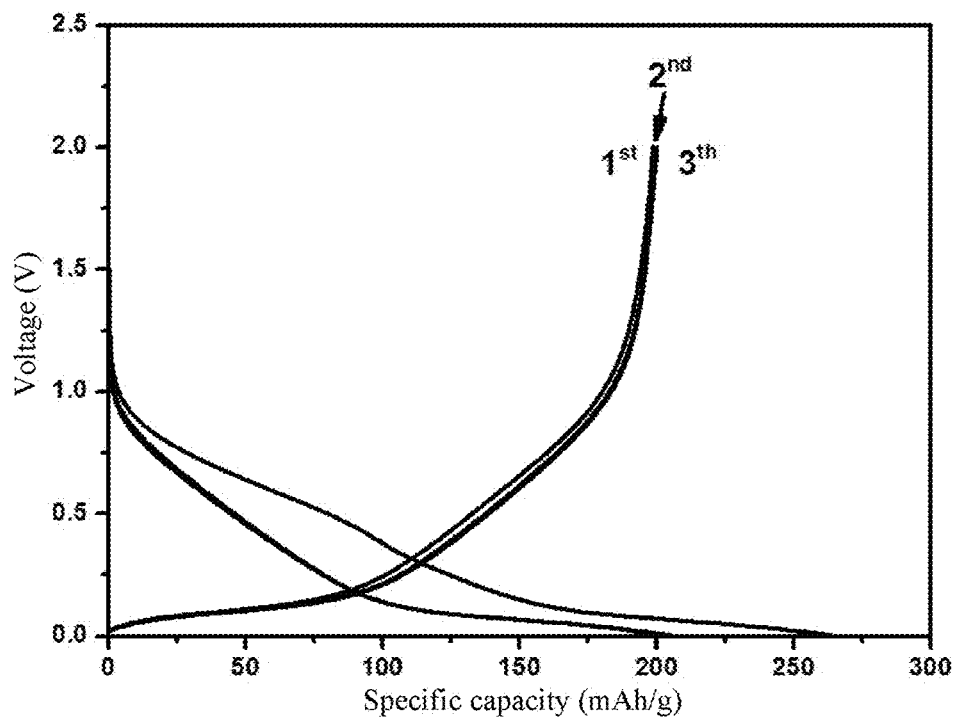
FIG. 9 is a constant current charge and discharge curve diagram of a sodium ion battery provided according to the embodiment 5 of the invention.

Anthracite of 2 g is weighed, loaded into a porcelain boat, and placed into a tubular furnace, firstly, nitrogen gas is introduced as protective gas, then temperature rises to 500° C. at a rate of 0.5° C./min, and heat preservation is performed for 3 h; then temperature rises to 1000° C. at a rate of 4° C./min, and heat preservation is performed for 10 h; and the material is taken out after being naturally cooled to room temperature and smashed, thus obtaining the final amorphous carbon material, namely, the sodium ion secondary battery anode material. An X Ray Diffraction (XRD) pattern thereof refers to FIG. 7, and it can be obtained from the XRD pattern that the amorphous carbon material has a $d_{002}$=0.386 nm and $L_c$=1.49 nm, an Raman spectrum thereof refers to FIG. 8, and it can be obtained from the Raman spectrum that the amorphous carbon material has $L_a$=4.49 nm. The prepared amorphous carbon material is used as an active substance of the battery anode material for preparing the sodium ion battery and performing an electrochemical charge and discharge test. A preparing process and a test method are same as embodiment 4, a test voltage range is 0-2V, a test result is as shown in FIG. 9, from FIG. 9, a reversible specific capacity is 200 mAh/g, the first cycle coulombic efficiency is 74% and cycle is stable.

Embodiment 6

Figure 10:
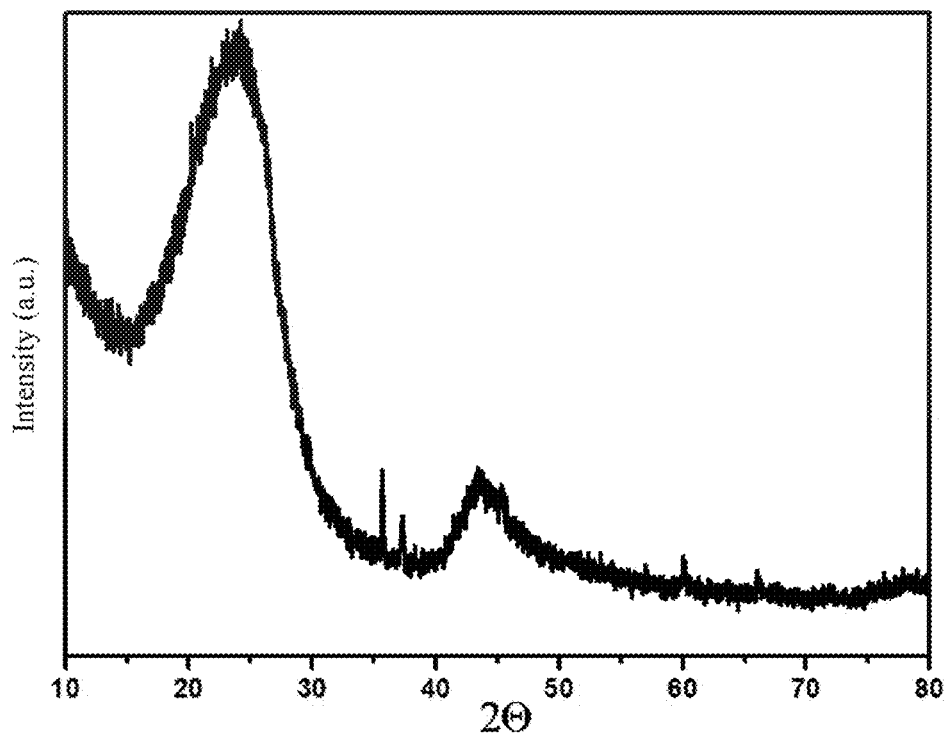
FIG. 10 is an XRD pattern of an amorphous carbon material provided according to an embodiment 6 of the invention.
Figure 11:
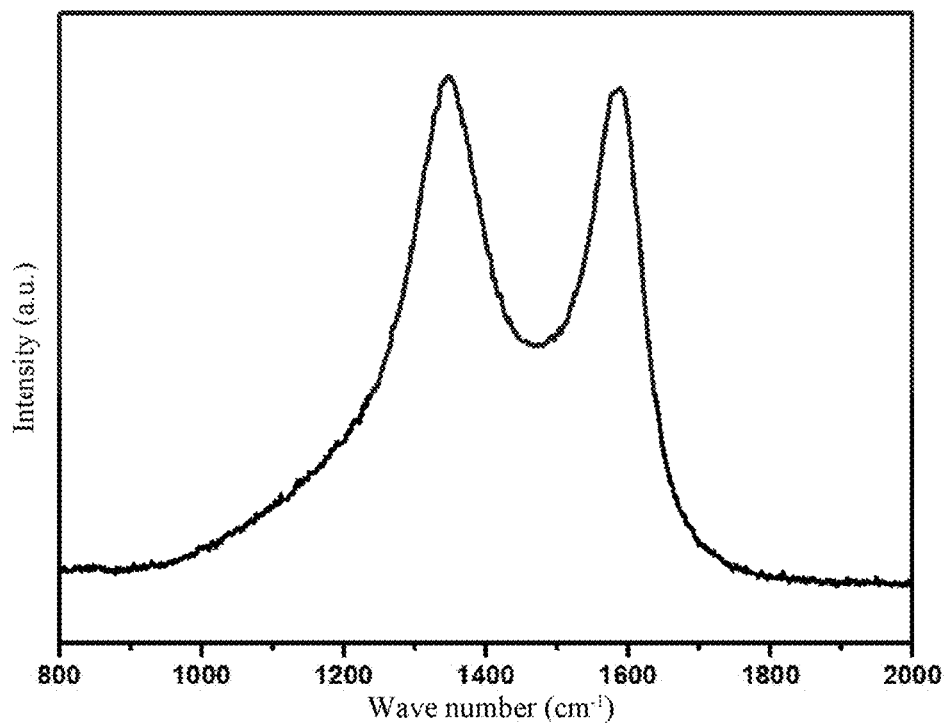
FIG. 11 is a Raman spectrum of an amorphous carbon material provided according to the embodiment 6 of the invention.

Anthracite of 2 g is weighed, loaded into a porcelain boat, and placed into a tubular furnace, firstly, nitrogen gas is introduced as protective gas, then temperature rises to 400° C. at a rate of 3° C./min, and heat preservation is performed for 5 h; then temperature rises to 1300° C. at a rate of 10° C./min, and heat preservation is performed for 4 h; and the material is taken out after being naturally cooled to room temperature and smashed, thus obtaining the final amorphous carbon material, namely, the sodium ion secondary battery anode material. An X Ray Diffraction (XRD) pattern thereof refers to FIG. 10, and it can be obtained from the XRD pattern that the amorphous carbon material has a $d_{002}$=0.373 nm and $L_c$=1.75 nm, an Raman spectrum thereof refers to FIG. 11, and it can be obtained from the Raman spectrum that the amorphous carbon material has $L_a$=4.31 nm.

Figure 12:
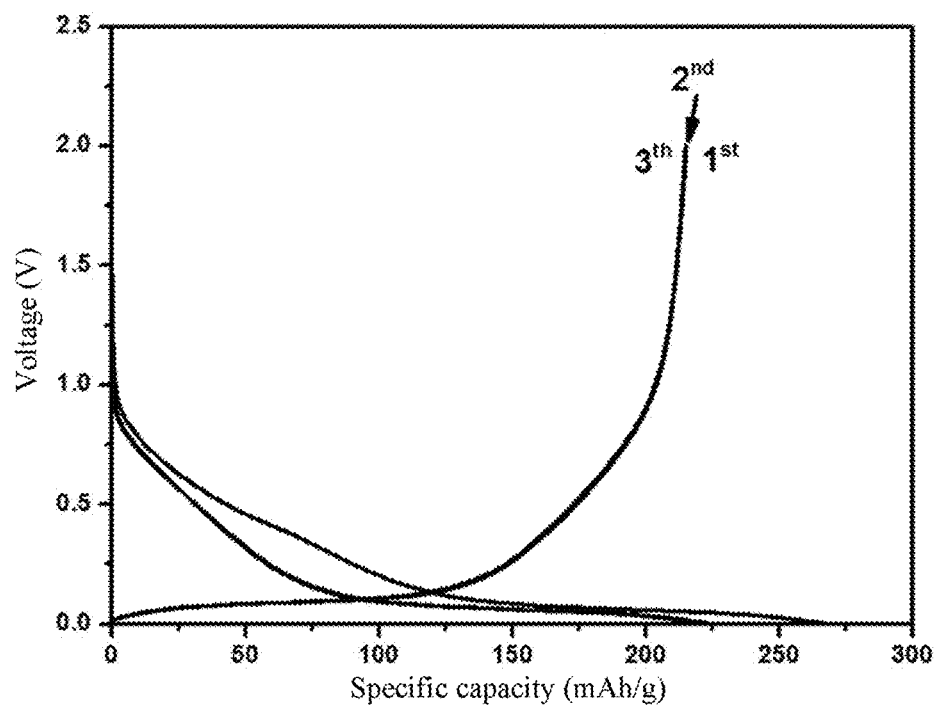
FIG. 12 is a constant current charge and discharge curve diagram of a sodium ion battery provided according to the embodiment 6 of the invention.

The prepared amorphous carbon material is used as an active substance of the battery anode material for preparing the sodium ion battery and performing an electrochemical charge and discharge test. A preparing process and a test method are same as embodiment 4, a test voltage range is 0-2V, a test result is as shown in FIG. 12, from FIG. 12, a reversible specific capacity is 215 mAh/g, and cycle is stable.

Embodiment 7

Figure 13:
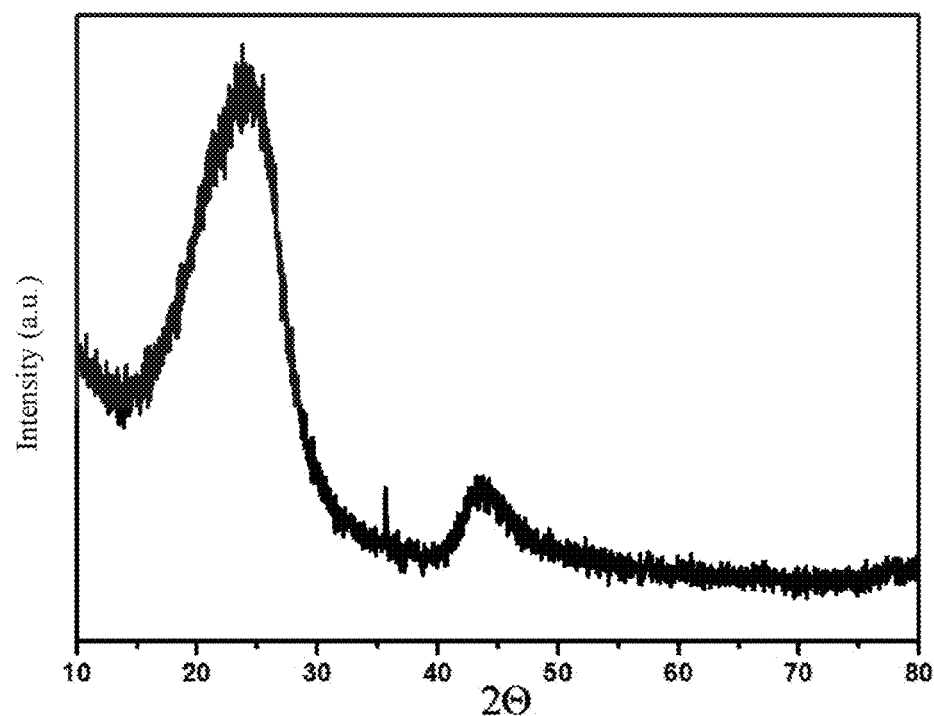
FIG. 13 is an XRD pattern of an amorphous carbon material provided according to an embodiment 7 of the invention.
Figure 14:
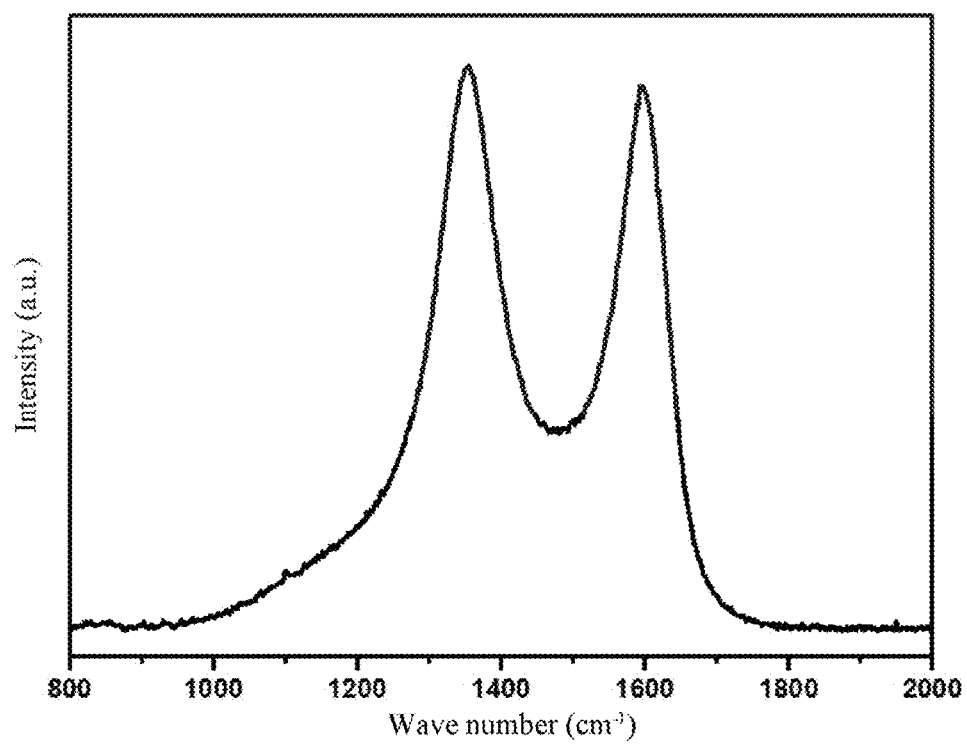
FIG. 14 is a Raman spectrum of an amorphous carbon material provided according to the embodiment 7 of the invention.
Figure 15:
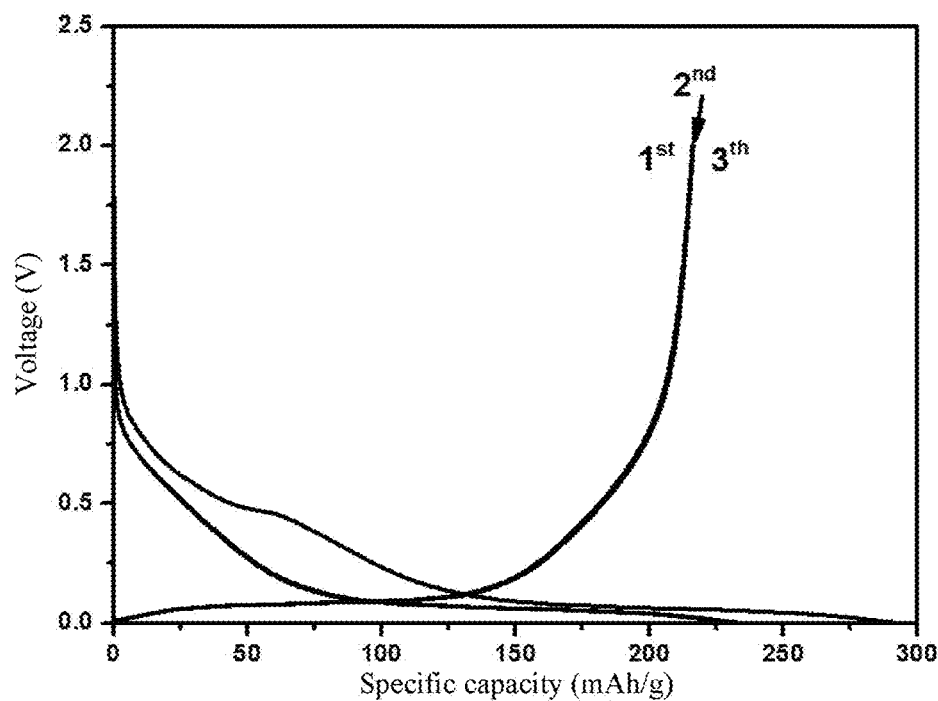
FIG. 15 is a constant current charge and discharge curve diagram of a sodium ion battery provided according to the embodiment 7 of the invention.

Anthracite of 2 g is weighed, loaded into a porcelain boat, and placed into a tubular furnace, firstly, nitrogen gas is introduced as protective gas, then temperature rises to 500° C. at a rate of 5° C./min, and heat preservation is performed for 0.5 h; then temperature rises to 1400° C. at a rate of 5° C./min, and heat preservation is performed for 7 h; and the material is taken out after being naturally cooled to room temperature and smashed, thus obtaining the final amorphous carbon material, namely, the sodium ion secondary battery anode material. An X Ray Diffraction (XRD) pattern thereof refers to FIG. 13, and it can be obtained from the XRD pattern that the amorphous carbon material has a $d_{002}$=0.368 nm and $L_c$=1.83 nm, an Raman spectrum thereof refers to FIG. 14, and it can be obtained from the Raman spectrum that the amorphous carbon material has $L_a$=4.25 nm. The prepared amorphous carbon material is used as an active substance of the battery anode material for preparing the sodium ion battery and performing an electrochemical charge and discharge test. A preparing process and a test method are same as embodiment 4, a test voltage range is 0-2V, a test result is as shown in FIG. 15, from FIG. 15, a reversible specific capacity is 216 mAh/g, the first cycle coulombic efficiency is 76% and cycle is stable.

Embodiment 8

Figure 16:
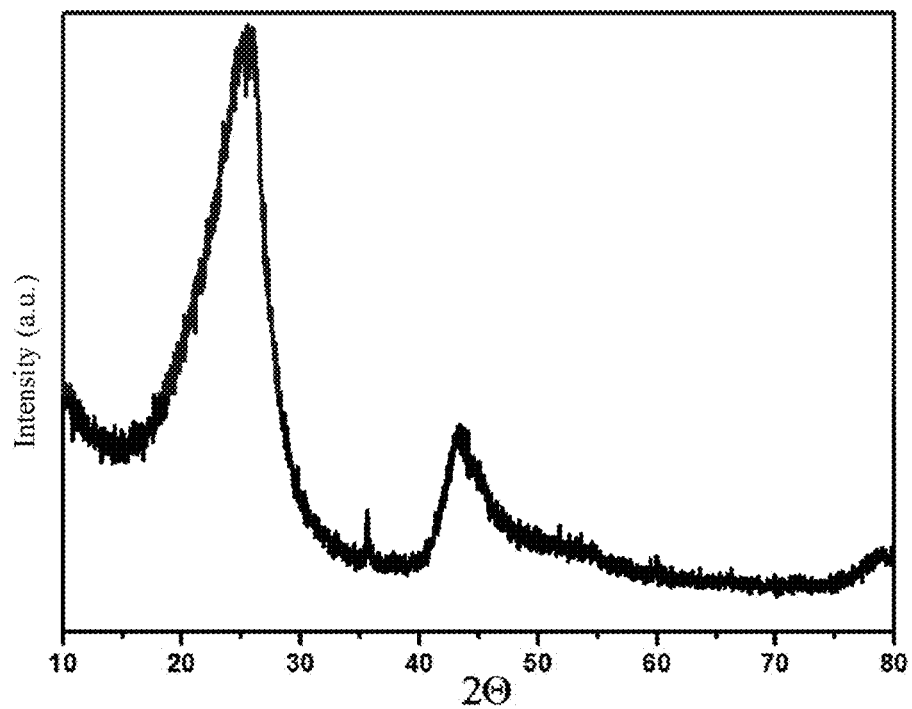
FIG. 16 is an XRD pattern of an amorphous carbon material provided according to an embodiment 8 of the invention.
Figure 17:
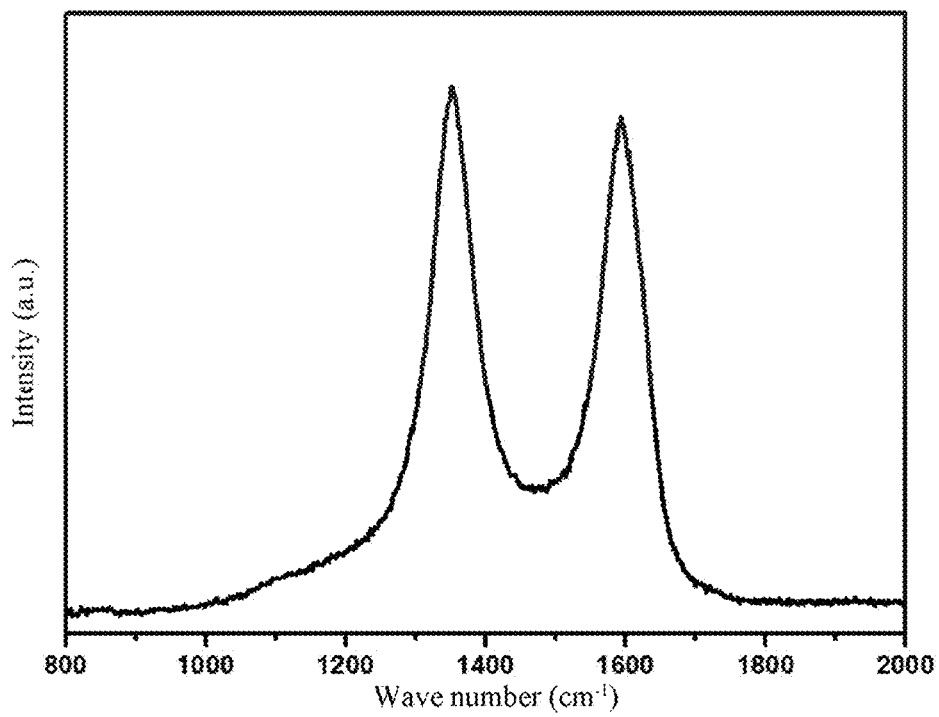
FIG. 17 is a Raman spectrum of an amorphous carbon material provided according to the embodiment 8 of the invention.

Anthracite of 2 g is weighed, loaded into a porcelain boat, and placed into a tubular furnace, firstly, nitrogen gas is introduced as protective gas, then temperature rises to 600° C. at a rate of 10° C./min, and heat preservation is performed for 2 h; then temperature rises to 1600° C. at a rate of 0.5° C./min, and heat preservation is performed for 1 h; and the material is taken out after being naturally cooled to room temperature and smashed, thus obtaining the final amorphous carbon material, namely, the sodium ion secondary battery anode material. An X Ray Diffraction (XRD) pattern thereof refers to FIG. 16, and it can be obtained from the XRD pattern that the amorphous carbon material has a $d_{002}$=0.350 nm and $L_c$=2.73 nm, an Raman spectrum thereof refers to FIG. 17, and it can be obtained from the Raman spectrum that the amorphous carbon material has $L_a$=4.17 nm.

Figure 18:
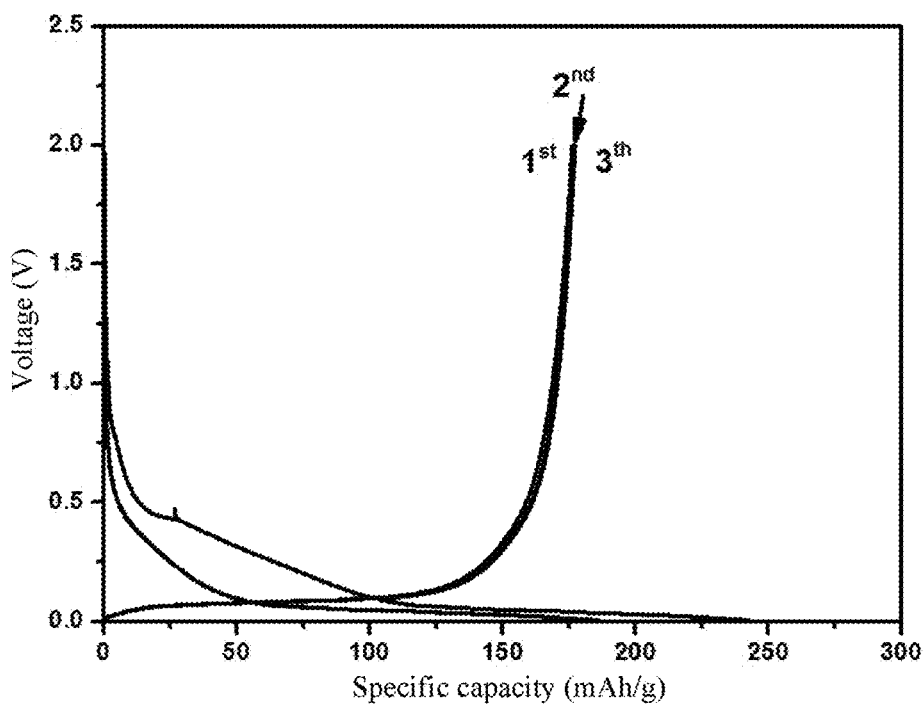
FIG. 18 is a constant current charge and discharge curve diagram of a sodium ion battery provided according to the embodiment 8 of the invention.

The prepared amorphous carbon material is used as an active substance of the battery anode material for preparing the sodium ion battery and performing an electrochemical charge and discharge test. A preparing process and a test method are same as embodiment 4, a test voltage range is 0-2V, a test result is as shown in FIG. 18, from FIG. 18, a reversible specific capacity is 176 mAh/g, the first cycle coulombic efficiency is 71% and cycle is stable.

Embodiment 9

Figure 19:
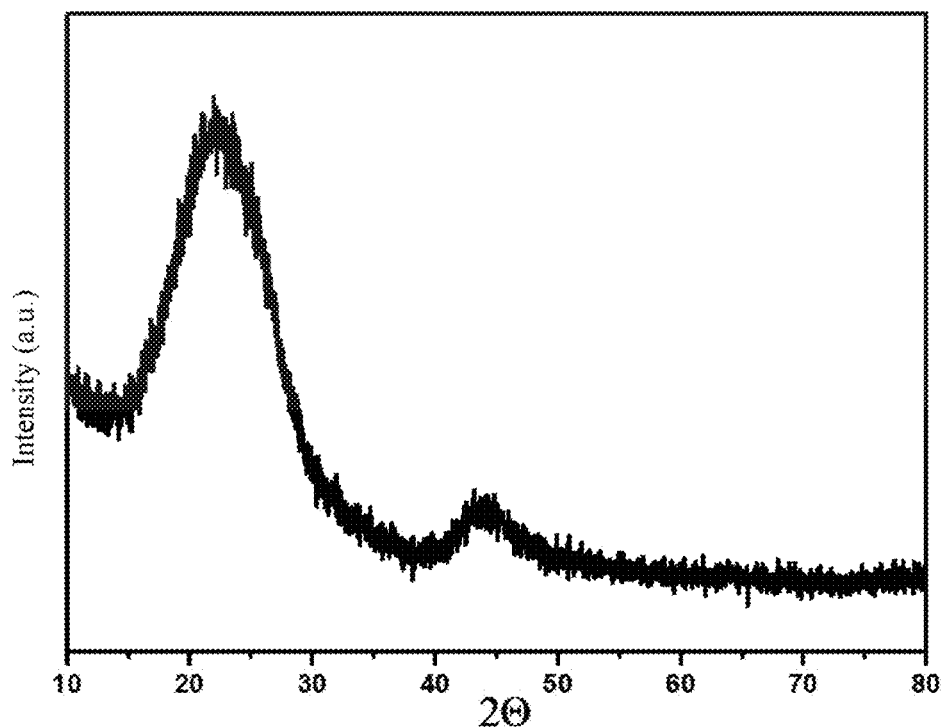
FIG. 19 is an XRD pattern of an amorphous carbon material provided according to an embodiment 9 of the invention.
Figure 20:
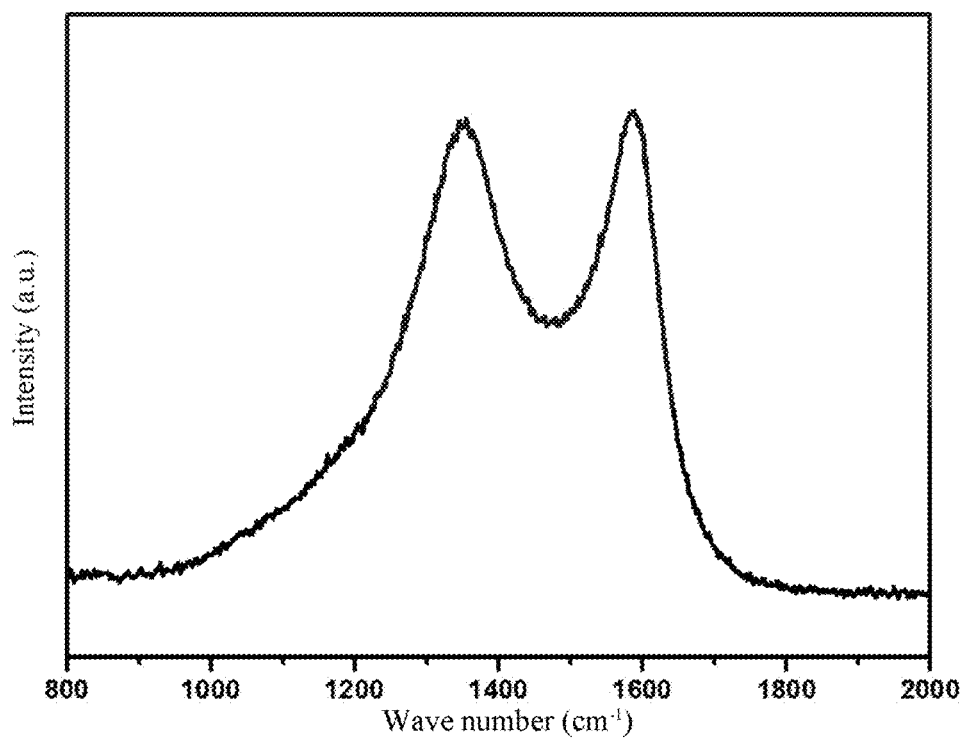
FIG. 20 is a Raman spectrum of an amorphous carbon material provided according to the embodiment 9 of the invention.

Anthracite of 2 g, lignin of 1.98 g and proper amount of water are weighed, added in a ball grinder and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1200° C. at a rate of 3° C./min, and heat preservation is performed for 2 h; and the material is taken out after being naturally cooled to room temperature and smashed, thus obtaining the final amorphous carbon material, namely, the sodium ion secondary battery anode material. An X Ray Diffraction (XRD) pattern thereof refers to FIG. 19, and it can be obtained from the XRD pattern that the amorphous carbon material has a $d_{002}$=0.398 nm and $L_c$=1.74 nm, an Raman spectrum thereof refers to FIG. 20, and it can be obtained from the Raman spectrum that the amorphous carbon material has $L_a$=4.50 nm.

Figure 21:
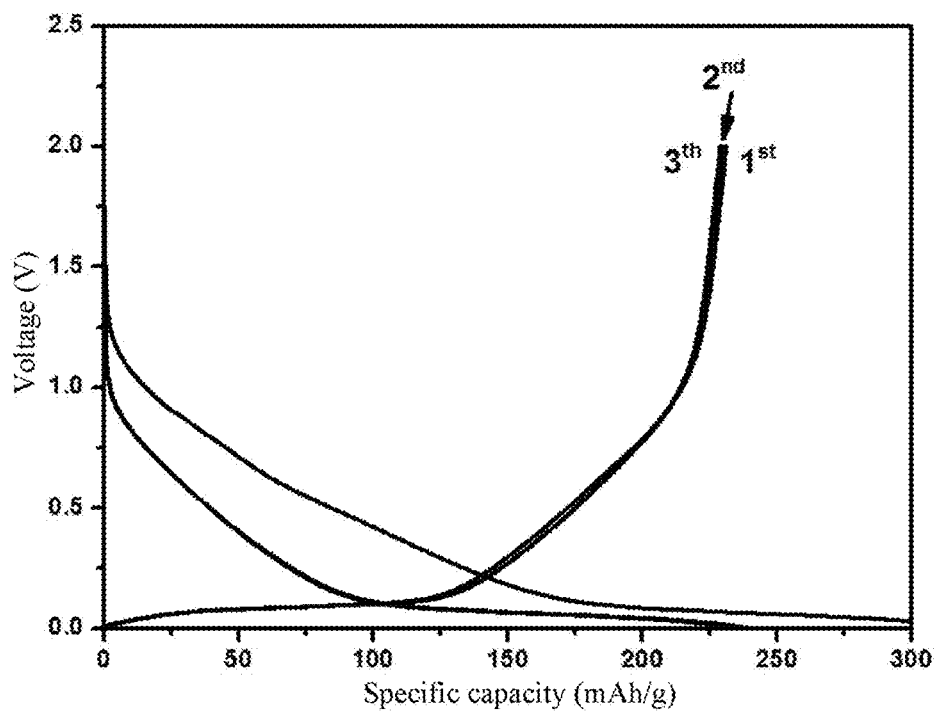
FIG. 21 is a constant current charge and discharge curve diagram of a sodium ion battery provided according to the embodiment 9 of the invention.

The prepared amorphous carbon material is used as an active substance of the battery anode material for preparing the sodium ion battery and performing an electrochemical charge and discharge test. A preparing process and a test method are same as embodiment 4, a test voltage range is 0-2V, a test result is as shown in FIG. 21, from FIG. 21, a reversible specific capacity is 230 mAh/g, and cycle is stable.

Embodiment 10

Anthracite of 2 g is weighed, loaded into a porcelain boat, and placed into a tubular furnace, firstly, nitrogen gas is introduced as protective gas, then temperature rises to 500° C. at a rate of 4° C./min, and heat preservation is performed for 3 h; then temperature rises to 1200° C. at a rate of 3° C./min, natural gas is introduced, and heat preservation is performed for 3 h for surface coating treatment to cause the surface to have a carbon coating layer; and the material is taken out after being naturally cooled to room temperature and smashed, thus obtaining the final amorphous carbon material, namely, the sodium ion secondary battery anode material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, the first cycle coulombic efficiency is 86% and a result is as shown in following table 1.

Embodiment 11

Anthracite of 2 g, lignin of 1.98 g and proper amount of water are weighed, added in a stirring device and stirred at room temperature for 5 h, obtained uniform slurry is directly dried in an oven, then loaded into a porcelain boat, and placed into a tubular furnace, firstly, nitrogen gas is introduced as protective gas, then temperature rises to 500° C. at a rate of 0.5° C./min, and heat preservation is performed for 3 h; then temperature rises to 1000° C. at a rate of 3° C./min, and heat preservation is performed for 6 h; and the material is taken out after being naturally cooled to room temperature and smashed, thus obtaining the final amorphous carbon material, namely, the sodium ion secondary battery anode material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in following table 1.

Embodiment 12

Anthracite of 2 g, lignin of 1.98 g and proper amount of water are weighed, added in an ultrasonic dispersing device and ultrasonically dispersed at room temperature for 5 h, obtained uniform slurry is spray-dried into spheres, then loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1400° C. at a rate of 3° C./min, and heat preservation is performed for 2 h; and the material is taken out after being naturally cooled to room temperature and smashed, thus obtaining the final amorphous carbon material, namely, the sodium ion secondary battery anode material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in following table 1.

Embodiment 13

Anthracite of 2 g, lignin of 1 g and proper amount of water are weighed, added in a ball grinder and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 600° C. at a rate of 1° C./min, and heat preservation is performed for 2 h; then temperature rises to 1200° C. at a rate of 3° C./min, and heat preservation is performed for 4 h; and the material is taken out after being naturally cooled to room temperature and smashed, thus obtaining the final amorphous carbon material, namely, the sodium ion secondary battery anode material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 14

Anthracite of 2 g, lignin of 1 g and proper amount of water are weighed, added in a ball grinder, mixed and ball-ground at room temperature for 2 h, and stirred for 3 h, obtained uniform slurry is directly dried in an oven, then loaded into a porcelain boat, and placed into a tubular furnace, firstly, nitrogen gas is introduced as protective gas, then temperature rises to 500° C. at a rate of 4° C./min, and heat preservation is performed for 2 h; then temperature rises to 1400° C. at a rate of 3° C./min, and heat preservation is performed for 3 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 15

Anthracite of 2 g, lignin of 0.2 g and proper amount of water are weighed, added in a ball grinder, mixed and ball-ground at room temperature for 3 h, and ultrasonically dispersed for 2 h, obtained uniform slurry is spray-dried into spheres, then loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1200° C. at a rate of 3° C./min, and heat preservation is performed for 2 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 16

Anthracite of 2 g, phenolic resin of 1.98 g and proper amount of ethanol are weighed, added in a ball grinder, and mixed and ball-ground at room temperature for 5 h, obtained uniform slurry is spray-dried into spheres, then loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1200° C. at a rate of 3° C./min, and heat preservation is performed for 2 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 17

Anthracite of 2 g, phenolic resin of 1.98 g and proper amount of ethanol are weighed, added in a ball grinder, and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 600° C. at a rate of 1° C./min, and heat preservation is performed for 4 h; then temperature rises to 1400° C. at a rate of 4° C./min, and heat preservation is performed for 5 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 18

Anthracite of 2 g, phenolic resin of 1 g and proper amount of ethanol are weighed, added in a ball grinder, and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 500° C. at a rate of 3° C./min, and heat preservation is performed for 2 h; then temperature rises to 1200° C. at a rate of 3° C./min, and heat preservation is performed for 2 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 19

Anthracite of 2 g, phenolic resin of 1 g and proper amount of ethanol are weighed, added in a stirring device, and stirred at room temperature for 5 h, obtained uniform slurry is spray-dried into spheres, then loaded into a porcelain boat, and placed into a tubular furnace, firstly, nitrogen gas is introduced as protective gas, then temperature rises to 500° C. at a rate of 10° C./min, and heat preservation is performed for 3 h; then temperature rises to 1400° C. at a rate of 3° C./min, and heat preservation is performed for 5 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 20

Anthracite of 2 g, phenolic resin of 0.2 g and proper amount of ethanol are weighed, added in a ball grinder, and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 500° C. at a rate of 5° C./min, and heat preservation is performed for 2 h; then temperature rises to 1200° C. at a rate of 5° C./min, and heat preservation is performed for 6 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 21

Anthracite of 2 g, glucose of 1 g and proper amount of water are weighed, added in an ultrasonically dispersing device, and ultrasonically dispersed at room temperature for 5 h, obtained uniform slurry is spray-dried into spheres, then loaded into a porcelain boat, and placed into a tubular furnace, firstly, nitrogen gas is introduced as protective gas, then temperature rises to 500° C. at a rate of 1° C./min, and heat preservation is performed for 3 h; then temperature rises to 1200° C. at a rate of 3° C./min, and heat preservation is performed for 2 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 22

Anthracite of 2 g, sucrose of 1 g, and proper amount of water are weighed, added in a ball grinder, and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 500° C. at a rate of 1° C./min, and heat preservation is performed for 4 h; then temperature rises to 1600° C. at a rate of 2° C./min, and heat preservation is performed for 0.5 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 23

Anthracite of 2 g, starch of 1 g and proper amount of water are weighed, added in a ball grinder, and mixed and ball-ground at room temperature for 5 h, obtained uniform slurry is spray-dried into spheres, then loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1200° C. at a rate of 3° C./min, and heat preservation is performed for 2 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 24

Anthracite of 2 g, polyacrylonitrile of 1 g and proper amount of ethanol are weighed, added in a ball grinder, and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1200° C. at a rate of 3° C./min, and heat preservation is performed for 2 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 25

Anthracite of 2 g, epoxy resin of 1 g and proper amount of ethanol are weighed, added in a ball grinder, mixed and ball-ground at room temperature for 3 h, and stirred for 2 h, obtained uniform slurry is spray-dried into spheres, then loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1200° C. at a rate of 2° C./min, and heat preservation is performed for 3 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 26

Bitumite of 2 g is loaded into a porcelain boat, and placed into a tubular furnace, firstly, nitrogen gas is introduced as protective gas, then temperature rises to 400° C. at a rate of 1° C./min, and heat preservation is performed for 3 h; then temperature rises to 1200° C. at a rate of 5° C./min, and heat preservation is performed for 3 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 27

Bitumite of 2 g is loaded into a porcelain boat, and placed into a tubular furnace, firstly, nitrogen gas is introduced as protective gas, then temperature rises to 500° C. at a rate of 1° C./min, and heat preservation is performed for 2 h; then temperature rises to 1400° C. at a rate of 3° C./min, and heat preservation is performed for 2 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in table 1.

Embodiment 28

Bitumite of 2 g, lignin of 1 g and proper amount of water are weighed, added in a ball grinder and mixed and ball-ground at room temperature for 5 h, obtained uniform slurry is directly dried in an oven, then loaded into a porcelain boat, and placed into a tubular furnace, firstly, nitrogen gas is introduced as protective gas, then temperature rises to 600° C. at a rate of 6° C./min, and heat preservation is performed for 2 h; then temperature rises to 1200° C. at a rate of 6° C./min, and heat preservation is performed for 5 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in following table 1.

Embodiment 29

Lignite of 2 g, lignin of 1 g and proper amount of water are weighed, added in a ball grinder and mixed ball-ground at room temperature for 5 h, obtained uniform slurry is directly dried in an oven, then loaded into a porcelain boat, and placed into a tubular furnace, firstly, nitrogen gas is introduced as protective gas, then temperature rises to 500° C. at a rate of 2° C./min, and heat preservation is performed for 2 h; then temperature rises to 1200° C. at a rate of 3° C./min, and heat preservation is performed for 3 h; and the material is taken out after being naturally cooled to room temperature and smashed, thus obtaining the final amorphous carbon material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, and a result is as shown in following table 1.

Embodiment 30

Anthracite of 2 g, lignin of 0.2 g and proper amount of water are weighed, added in a ball grinder, mixed and ball-ground at room temperature for 3 h, and ultrasonically dispersed for 2 h, obtained uniform slurry is spray-dried into spheres, then loaded into a porcelain boat, and placed into a tubular furnace, firstly, nitrogen gas is introduced as protective gas, then temperature rises to 500° C. at a rate of 4° C./min, and heat preservation is performed for 1 h; then temperature rises to 1200° C. at a rate of 3° C./min, then natural gas is introduced, heat preservation is performed for 3 h, and surface coating treatment is performed to enable the surface to have a carbon coating layer; and the material is taken out after being naturally cooled to room temperature and smashed, thus obtaining the final amorphous carbon material, namely the sodium ion secondary battery anode material.

The prepared amorphous carbon material is used as an active substance of the battery anode material for preparing the sodium ion battery and performing an electrochemical charge and discharge test. A preparing process and a test method are same as embodiment 4, a test voltage range is 0-2V, the first cycle coulombic efficiency is 88%, and other results are as shown in following table 1.

Embodiment 31

Figure 22:
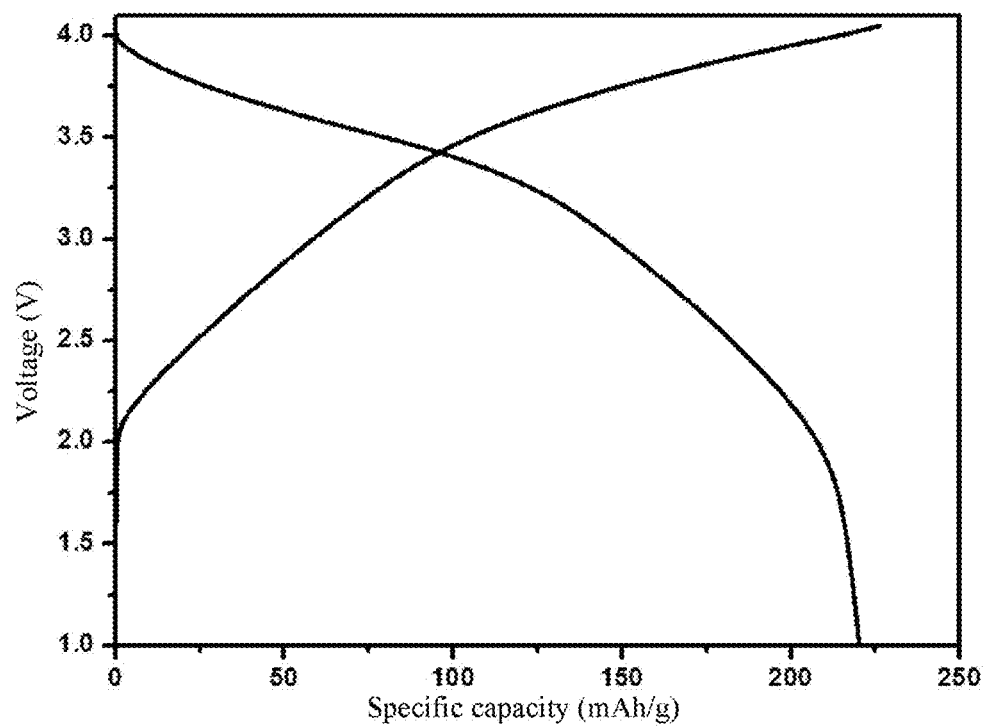
FIG. 22 is a typical constant current charge and discharge curve diagram of a sodium ion total battery provided according to an embodiment 30 of the invention.

The amorphous carbon material provided in embodiment 4 as a sodium ion secondary battery anode material, $Na_{0.9}[Cu_{0.2}Fe_{0.3}Mn_{0.5}]O_2$ as a sodium ion secondary battery cathode material are employed to assemble a sodium ion total battery and an electrochemical test is performed. The test method is same as embodiment 4. A test voltage range is 1-4.05V, a test result is as shown in FIG. 22, and from FIG. 22, a reversible specific capacity is 220 mAh/g and an average voltage is 3.2V.

TABLE 1

Related structural parameters and specific capacities of the anode material prepared in different embodiments

| Embodiments | Raw materials | Final pyrolyzing temperature (° C.) | Specific capacity (mAh/g) | $d_{002}$ (nm) | $L_c$ (nm) | $L_a$ (nm) |
|---|---|---|---|---|---|---|
| 10 | Anthracite (carbon coating layer) | 1200 | 225 | 0.375 | 1.74 | 4.38 |
| 11 | Anthracite:Lignin = 1:0.99 | 1000 | 205 | 0.405 | 1.51 | 4.54 |
| 12 | Anthracite:Lignin = 1:0.99 | 1400 | 250 | 0.384 | 1.85 | 4.40 |
| 13 | Anthracite:Lignin = 1:0.5 | 1200 | 220 | 0.381 | 1.74 | 4.56 |
| 14 | Anthracite:Lignin = 1:0.5 | 1400 | 226 | 0.376 | 1.87 | 4.47 |
| 15 | Anthracite:Lignin = 1:0.1 | 1200 | 223 | 0.369 | 1.72 | 4.35 |
| 16 | Anthracite:Phenolic resin = 1:0.99 | 1200 | 240 | 0.402 | 1.71 | 4.47 |
| 17 | Anthracite:Phenolic resin = 1:0.99 | 1400 | 248 | 0.387 | 1.83 | 4.38 |
| 18 | Anthracite:Phenolic resin = 1:0.5 | 1200 | 230 | 0.386 | 1.72 | 4.53 |
| 19 | Anthracite:Phenolic resin = 1:0.5 | 1400 | 235 | 0.379 | 1.85 | 4.46 |
| 20 | Anthracite:Phenolic resin = 1:0.1 | 1200 | 225 | 0.368 | 1.71 | 4.34 |
| 21 | Anthracite:Glucose = 1:0.5 | 1200 | 212 | 0.380 | 1.75 | 4.53 |
| 22 | Anthracite:Sucrose = 1:0.5 | 1600 | 210 | 0.378 | 1.71 | 4.52 |
| 23 | Anthracite:Starch = 1:0.5 | 1200 | 204 | 0.371 | 1.70 | 4.51 |
| 24 | Anthracite:Polyacrylonitrile = 1:0.5 | 1200 | 230 | 0.381 | 1.70 | 4.51 |
| 25 | Anthracite:Epoxy resin = 1:0.5 | 1200 | 230 | 0.389 | 1.74 | 4.55 |
| 26 | Bitumite | 1200 | 210 | 0.371 | 1.68 | 4.31 |
| 27 | Bitumite | 1400 | 195 | 0.365 | 1.72 | 4.28 |
| 28 | Bitumite:Lignin = 1:0.5 | 1200 | 210 | 0.391 | 1.69 | 4.48 |
| 29 | Lignite:Lignin = 1:0.5 | 1200 | 190 | 0.397 | 1.64 | 4.43 |
| 30 | Anthracite:Lignin = 1:0.1 (carbon coating layer) | 1200 | 229 | 0.375 | 1.73 | 4.34 |

According to the description of the preparation of the sodium ion secondary battery anode material provided in the embodiments of the invention, the method is simple and low in cost, resource of the raw materials is rich, and the sodium ion secondary battery anode material is a non-pollution environment-friendly material, and can serve as an anode active material of a sodium ion secondary battery to be used in a secondary battery. The sodium ion secondary battery fabricated with the amorphous carbon anode material provided in the embodiments of the invention has lower cost, higher work voltage and energy density, which is stable in cycle and good in safety, and can be used as power sources for mobile devices, electric vehicles, and large-scale energy storage devices of solar power generation, wind power generation, intelligent power grid peak pitching, distributed power stations, standby power sources or communication base stations.

Above mentioned specific embodiments further describe aims, technical solutions and beneficial effects of the invention in detail, it should be understood that the above mentioned is merely specific implementation modes of the invention without limiting a protection scope of the invention, and any modifications, equivalent substitutions and improvements made within the spirit and principle of the invention are contained in a protection scope of the invention.

What is claimed is:

1. A sodium ion secondary battery anode material, characterized in that the material is an amorphous carbon material, which is prepared by using coal and a hard carbon precursor as raw materials, mechanical mixing after adding a solvent, drying, and crosslinking, curing and pyrolyzing under an inert gas atmosphere.

2. The material according to claim 1, characterized in that the material is granular, average grain size of granules is 1-50 μm; a d002 value is between 0.35-0.42 nm, an Lc value is between 1-4 nm and an La value is between 3-5 nm.

3. The material according to claim 1, characterized in that the surface of the material is provided with a coating layer.

4. The material according to claim 1, characterized in that the coal comprises one or a mixture of any composite of anthracite, bitumite and lignite; and the hard carbon precursor comprises one or a mixture of any composite of glucose, sucrose, lignin, cellulose, starch, phenolic resin, polyacrylonitrile and epoxy resin.

5. An anode of a secondary battery, characterized by comprising:
a current collector, a binder coated onto the current collector and the sodium ion secondary battery anode material according to claim 1.

6. A secondary battery comprising the anode according to claim 5.

7. Application of the secondary battery according to claim 6, characterized in that the secondary battery is used for mobile devices, electric vehicles, and large-scale energy storage devices of solar power generation, wind power generation, intelligent power grid peak pitching, distributed power stations, standby power sources or communication base stations.

8. A sodium ion secondary battery anode material, characterized in that the material is an amorphous carbon material, which is prepared by using coal as a raw material, and pyrolyzing under an inert gas atmosphere, characterized in that the material is granular, average grain size of granules is 1-50 μm; a d002 value is between 0.35-0.42 nm, an Lc value is between 1-4 nm and an La value is between 3-5 nm.

9. The material according to claim 8, characterized in that the surface of the material is provided with a coating layer.

10. The material according to claim 8, characterized in that the coal comprises one or a mixture of any composite of anthracite, bitumite and lignite.

11. An anode of a secondary battery, characterized In that the anode comprises:
   a current collector, a binder coated onto the current collector and the sodium ion secondary battery anode material according to claim 8.

12. A secondary battery comprising the anode according to claim 11.

13. Application of the secondary battery according to claim 12, characterized in that the secondary battery is used for mobile devices, electric vehicles, and large-scale energy storage devices of solar power generation, wind power generation, intelligent power grid peak pitching, distributed power stations, standby power sources or communication base stations.

14. A preparing method of a sodium ion secondary battery anode material, characterized by comprising following steps:

(1) adding coal and a hard carbon precursor into a solvent according to a mass ratio of 1:(0-0.99), and then performing mechanical mixing to obtain a slurry;
(2) drying the slurry;
(3) rising temperature to 400-600° C. under an inert gas atmosphere and reacting for 0.5-5 h;
(4) rising temperature to 1000-1600° C. under the inert gas atmosphere and reacting for 0.5-10 h;
(5) cooling to obtain the sodium ion secondary battery anode material, wherein, the steps (3)-(5) are directly performed when the mass ratio of the coal and the hard carbon precursor in step (1) is 1:0.

15. The preparing method according to claim 14, characterized in that temperature rising rate in step (3)-(4) is 0.5-10° C./min.

16. The preparing method according to claim 14, characterized in that the mechanical mixing comprises any one or more of ball grinding, stirring and ultrasonic dispersing.

17. The preparing method according to claim 14, characterized in that the method also comprises:
   introducing gas containing hydrocarbon with a flow of 0.5-200 ml/min in a reaction process of step (4) for surface coating;
   the gas containing hydrocarbon comprises any one or more of natural gas, methane, ethane, methyibenzene, ethylene, acetylene and allylene.

* * * * *

UNITED STATES PATENT AND TRADEMARK OFFICE
CERTIFICATE OF CORRECTION

PATENT NO. : 10,651,472 B2
APPLICATION NO. : 15/752399
DATED : May 12, 2020
INVENTOR(S) : Yongsheng Hu, Yunming Li and Liquan Chen Page 1 of 1

It is certified that error appears in the above-identified patent and that said Letters Patent is hereby corrected as shown below:

On the Title Page
In ITEM (71) change "INSTITUTE OF PHYSICS, THE CHINESE ACADEMY OF SCIENCES,"
to --Institute of Physics, The Chinese Academy of Sciences,--

In the Specification
Column 7, Line 11, change "secondary batteries" to --secondary batteries.--

Signed and Sealed this
Seventh Day of July, 2020

Andrei Iancu
*Director of the United States Patent and Trademark Office*